(12) United States Patent
Maier

(10) Patent No.: US 6,473,294 B1
(45) Date of Patent: Oct. 29, 2002

(54) SYSTEM FOR DISTRIBUTING ENERGY AND DATA IN ENERGY DISTRIBUTING FACILITIES

(75) Inventor: Reinhard Maier, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/763,656
(22) PCT Filed: Aug. 16, 1999
(86) PCT No.: PCT/DE99/02563
§ 371 (c)(1), (2), (4) Date: Apr. 24, 2001
(87) PCT Pub. No.: WO00/13276
PCT Pub. Date: Mar. 9, 2000

(30) Foreign Application Priority Data

Aug. 28, 1998 (DE) .......................... 198 39 288

(51) Int. Cl.⁷ .................................................. H02B 1/20
(52) U.S. Cl. ...................... 361/611; 361/601; 361/614; 361/657; 361/636; 361/640
(58) Field of Search ................................. 361/601, 611, 361/624, 637, 650, 639, 631, 642, 826; 174/68.2, 72 B, 71 B; 439/32, 50, 65, 153, 76.2, 79, 213

(56) References Cited

U.S. PATENT DOCUMENTS

| | | | | |
|---|---|---|---|---|
| 5,023,752 A | * | 6/1991 | Detter et al. ................. | 361/752 |
| 5,046,172 A | * | 9/1991 | Moreux et al. ............. | 361/601 |
| 5,579,217 A | * | 11/1996 | Deam et al. ................. | 363/144 |
| 6,002,580 A | * | 12/1999 | LeVantine et al. .......... | 361/634 |
| 6,008,982 A | * | 12/1999 | Smith .......................... | 361/772 |
| 6,162,990 A | * | 12/2000 | Sakamoto .................... | 174/59 |
| 6,280,253 B1 | * | 8/2001 | Kraus et al. ................. | 439/621 |

* cited by examiner

Primary Examiner—Boris Chervinsky
(74) Attorney, Agent, or Firm—Harness, Dickey & Pierce, P.L.C.

(57) ABSTRACT

A large number of switching devices, for example contactors, can be supplied with power and information in particular in switchgear cabinets. A multilayer supply board includes a large number of suitable recesses with fingers which form contacts. The recesses preferably form an array with m rows and n columns in the supply board. The multilayer supply board preferably includes at least a number of layers of electrically conductive boards which are insulated from one another.

14 Claims, 3 Drawing Sheets

SYSTEM FOR DISTRIBUTING ENERGY AND DATA IN ENERGY DISTRIBUTING FACILITIES

This application is the national phase under 35 U.S.C. §371 of PCT International Application No. PCT/DE99/02563 which has an International filing date of Aug. 16, 1999, which designated the United States of America.

FIELD OF THE INVENTION

The invention relates to a system for power and data distribution in power distribution systems, in particular in switchgear cabinets. A large number of switching devices, for example electrical contactors, which make electrical contact are provided in switching devices such as these.

BACKGROUND OF THE INVENTION

Electrical power is distributed by means of central and decentralized power distribution systems, for example switchgear cabinets, to the individual loads, such as motors. The switchgear cabinets contain, inter alia, the appliances such as contactors used for switching. The switching devices are snapped onto top-hat section rails and are connected to the supply busbars via an adapter system. Modern busbar systems have additional rails in the bus systems, via which the switching devices can communicate. Top-hat section rails, busbars and data rails can in this case be fitted in the form of rows in the switchgear cabinet. Vertical rails form the connections for the horizontal rails. The distances between the individual rows depend on the largest switching devices fitted to the rails. If small devices are snapped on, the available space is not utilized.

DE 44 09 318 C2 discloses a switching distribution board for switching electrical loads on and off, in which a system for power and data distribution in power distribution systems is provided, with a large number of switching devices being provided in the distribution system. In addition, WO 93/07597 A1 discloses a system for power and data distribution in power distribution systems, in which individual switching devices make contact with a power bus and a data bus. Finally, DE 195 11 350 discloses a busbar channel in a low-voltage switchgear assembly, in which a system for power distribution in power distribution systems having a large number of switching devices with which contact is made via an opening in a busbar channel system, is likewise provided.

Going beyond the latter prior art, U.S. Pat. No. 5,587,890 A discloses a system for distribution of electrical power in which parallel boards have an array with recesses which can be incorporated in them, and a specific region in the array is defined for carrying current in each board. Corresponding regions in the individual boards are connected via conductive connecting elements so that an electrical unit with inputs and outputs for carrying current can be formed as appropriate for the particular problem. In an entirely corresponding manner, in WO 96/15577 A1, boards which can be stacked one on top of another are electrically connected to one another in a specific pattern by means of electrical connecting elements.

SUMMARY OF THE INVENTION

Against the background of the prior art, the object of the invention is to supply switching devices in a power distribution system—such as that formed by a switchgear cabinet for example—with power, and to connect the switching devices to communication devices. The switching devices are intended to be capable of being fitted easily, with the electrical connection being produced in one process and with the switching devices being intended to be fitted in a space-saving manner.

In the invention, a multilayer supply board having a large number of recesses, which are used for variable accommodation of individual switching devices, is provided for two-dimensional power distribution in the distribution system. In this case, the recesses are designed specifically for variable accommodation of the switching devices, wherein a respective finger for carrying power and data projects into the recess is preferably used. An individual switching device can in this case be attached to the individual phase lines in a simple manner.

In the invention, the recesses preferably form an array with m rows and n columns in the supply board. The supply board preferably includes at least a number of layers of electrically conductive boards which are insulated from one another by an insulator and are composed, for example, of copper or aluminum, acting as current-carrying conductor layers.

A particularly advantageous feature of the invention is that contact can be made with power and bus lines in one process, for which purpose there are contact-forming fingers for the individual connections of the switching devices in the recesses in the supply board. The fitting and making of all the electrical connections can now be carried out by means of a single screw or clamping connection. This results in a space-saving arrangement with an optimum packing density for the switching devices, and with no connection being required between the row-like rails in a corresponding manner to conventional cabinet technology. High currents can be carried with a low current density. Higher current densities occur only in the contact results in a good shielding effect for the virtually enclosed boards, and with the capability for the lowermost and uppermost boards to be, for example, at ground potential (PE).

BRIEF DESCRIPTION OF THE DRAWINGS

Further details and advantages of the invention will become evident from the following description of the figures of the exemplary embodiments and with reference to the drawing in conjunction with the patent claims. In the figures, in each case illustrated schematically:

Identical or equivalent parts have the same reference symbols in the figures. The figures will be described jointly in the following text.

DETAILED DESCRIPTION OF THE PREFERRED EMBODIMENTS

Figure 1:
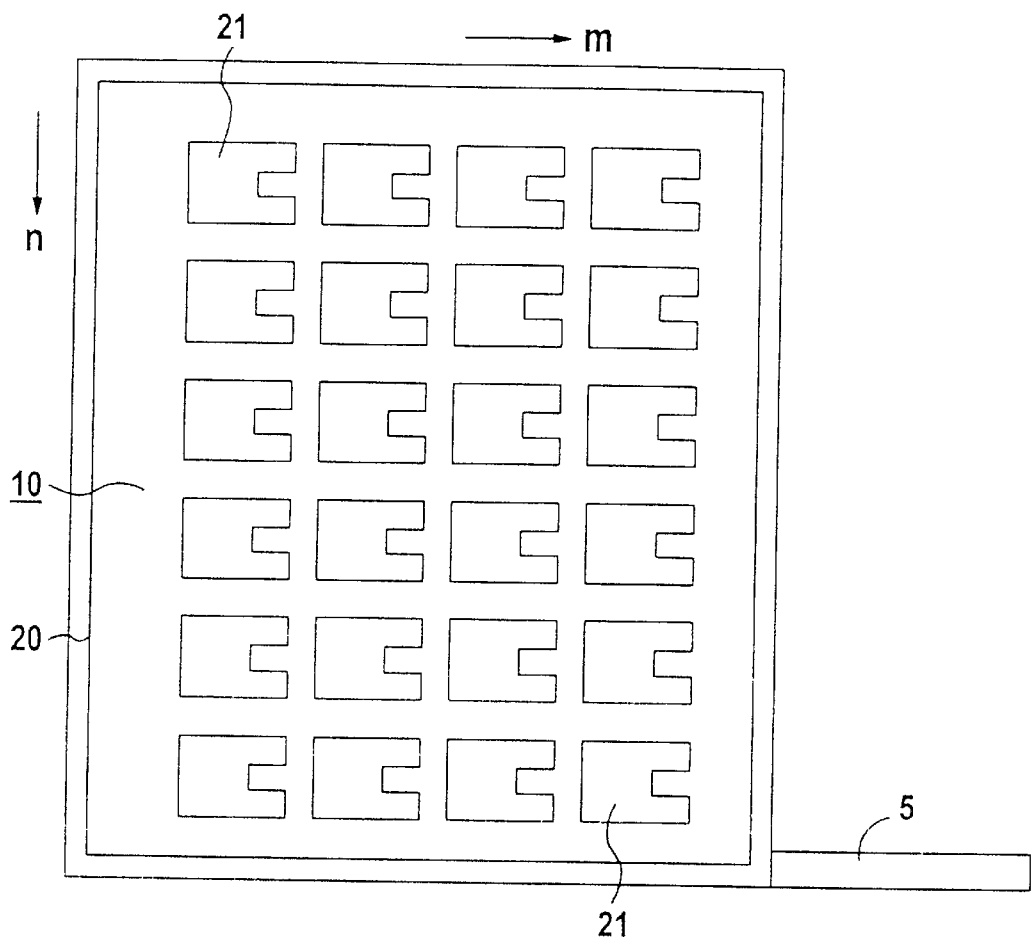
FIG. 1 shows a plan view of the system with a supply board.
Figure 3:
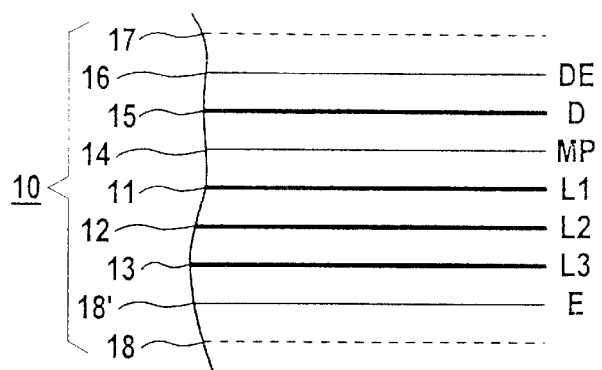
FIG. 3 shows a schematic section through the supply board shown in FIG. 1.

One feature of a novel system for power and data distribution is that the distribution is two-dimensional, that is to say flat. FIGS. 1 and 3 show a multilayer so-called supply board 10 as an element of the invention, in various views. The supply board 10 has a large number of ⌐-shaped cutouts 21 with a structure that forms fingers and into which switching devices can be inserted. Therefore, these cutouts 21 are formed as yokes. The insertion process at the same time results in contact being made with the individual phases.

In detail, the supply board 10 includes a number of conductive boards which are insulated from one another by a suitable material and are composed, for example, of copper or aluminum. Three conductor layers 11, 12, 13 formed in this way and, corresponding to FIG. 2, identify, for example, the supplying three-phase network with phases L1 to L3. Additional layers, which are not shown in detail in FIG. 1 or FIG. 2, but which are illustrated in FIG. 3, can form the communication connections.

In FIG. 3, a layer sequence comprising layers 11 to 13 for a three-phase network with phases L1, L2, L3, and a layer 14 for the associated neutral point conductor MP, are combined with a layer 15 for data transmission D and a layer 16 for its grounding DE. The outermost layers 17, 18 or 18' of the supply board 10 are either insulation layers or grounded boards, as is indicated by way of example by $E_{MP}$. The last-mentioned layer, in particular, ensures good shielding for the system. Layers which are not denoted in any more detail but are composed of insulation material are arranged between the layers which are in the form of conductive boards 11 to 16 and, possibly, grounding 17, 18; alternatively air is used as insulation.

The boards 14, 16 for the neutral point conductor and grounding, the outer boards 17, 18 and 18', and the insulation layers of the supply board 10 each have aligned rectangular cutouts, which are not shown in FIG. 3. Thus, the free-standing conductive fingers 25, 25', 25" corresponding to FIG. 2 project into each cutout 21 from the conductive boards 11 to 13 for the power supply, on the one hand, and from the layer 14 for data transmission on the other hand.

Figure 2:
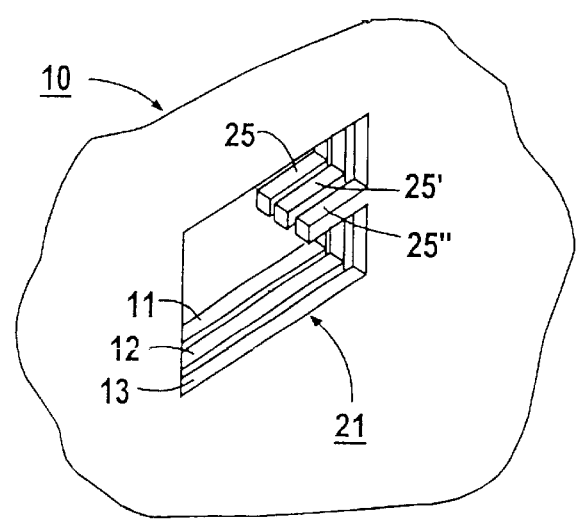
FIG. 2 shows a perspective view of a detail from the supply board shown in FIG. 1, illustrating the multilayer form.
Figure 4:
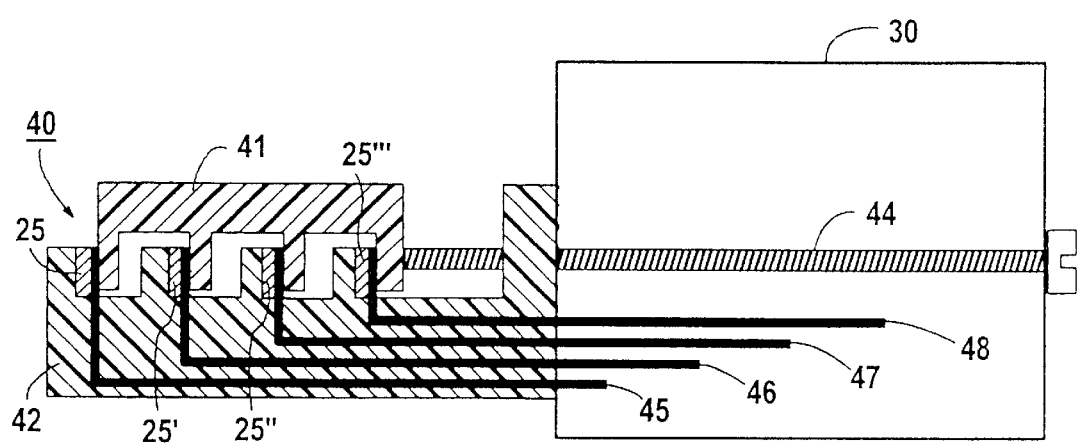
FIG. 4 shows an illustration of coupling of a switching device.

In order to fit a switching device 30, as shown in FIG. 4, into one of the cutouts 21 in the supply board 10, as shown in FIG. 1 or 2, and to make contact with it, the contact support 40 is pushed laterally over the contact fingers 25 of the supply board 10. If the contact support 40 is in the form of two comb-like insulating elements 41, 42 which can be pressed against one another, the conductive boards 11 to 13, 14 for power and data transmission on the supply board 10 can make contact via their contact fingers 25 with the corresponding conductors 45 to 48 of the switching device 30 in just one process. The comb-like elements 41, 42, the fingers 25 and the conductors 45 to 48 are fixed via a longitudinal screw 44. This connection is also used for mechanical mounting of the switching device 30 on the supply board 10.

Figure 5:
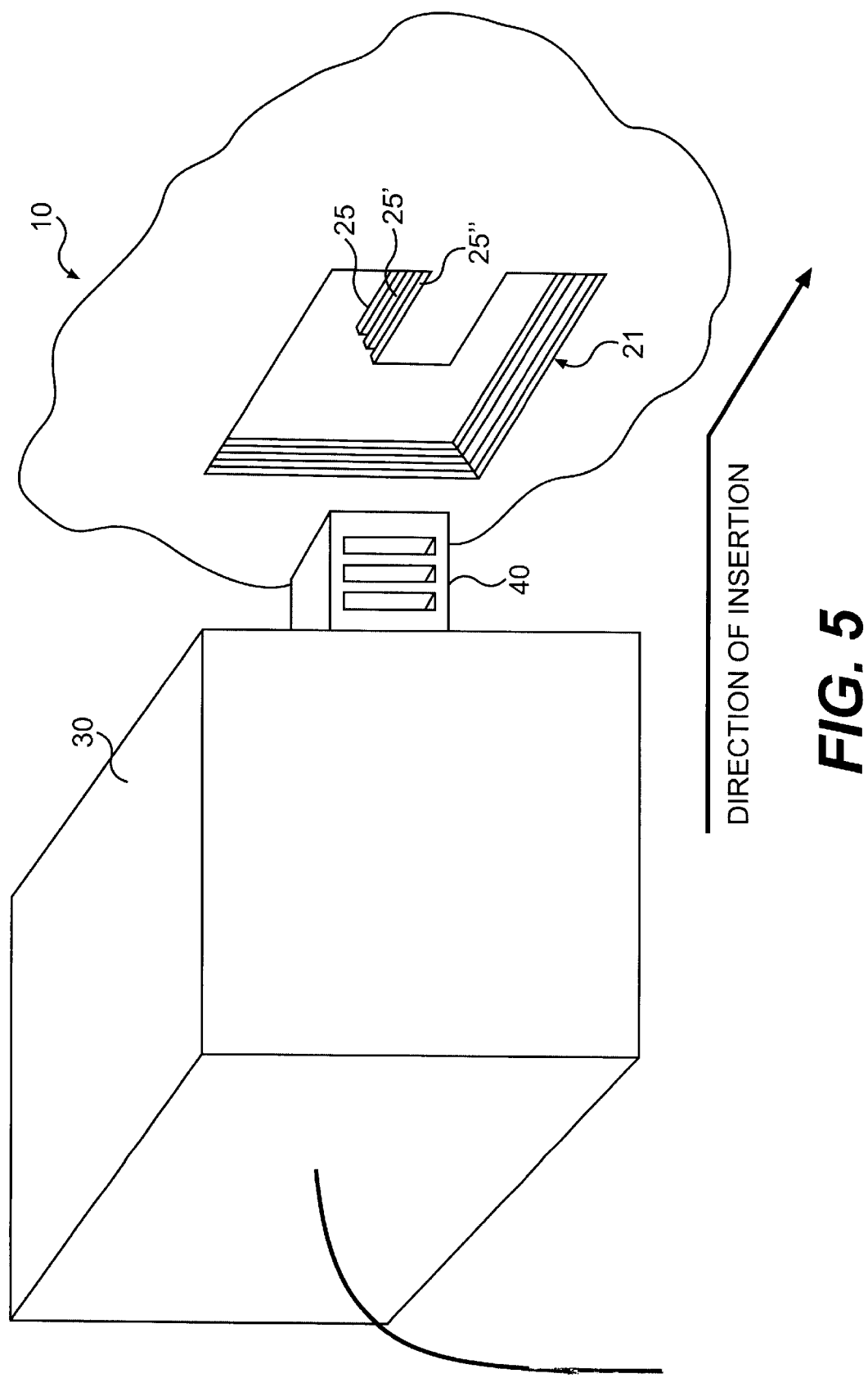
FIG. 5 shows an illustration of a switching device in accordance with an embodiment of the present invention.

FIG. 4 shows a screw connection 44 for the attachment of the contact-making elements 41 and 42. A clamping or snap-action attachment with a suitable lever apparatus can likewise also be used here as a latching mechanism. For example, as is shown in FIG. 5, the switching device 30 may latch to the fingers 25, 25', 25" via the contact support 40. A load is connected to the switching device 30 in a conventional manner, and is not shown in FIG. 4.

The array size in which m*n cutouts 21 are arranged on the supply board 10 is advantageously governed by the dimensions of the smallest switching device. Since, particularly in the case of electronically controlled switching devices which require only minimal sealing power levels, the power losses are very low, it is thus possible to achieve a maximum packing density in the switchgear cabinet.

Power is expediently fed into the distribution board 10 via a suitable rail 5 on a circumferential edge 20 of the supply board 10. If required, the edge 20 of the supply board 10 is reinforced such that the current can flow essentially radially to the switching devices. This means that the current densities in the supply board 10 remain low. The current density is higher only in the fingers 25, 25', 25". In addition, the switching devices do not all carry high current at the same time.

In the described system, the use of a multilayer supply board with cutouts matching the array size is a major factor. The configuration of the switching device with associated contact supports allows all the electrical and mechanical connections for the supply board to be made in one process. This results in considerable simplifications in practice.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for power and data distribution in power distribution systems including at least one switching device, comprising:

a multilayer supply board, including a plurality of recesses used for variable accommodation of individual switching devices, for two-dimensional power distribution in the distribution system, wherein each of the plurality of the recesses includes a latching mechanism having individual fingers which extend into the recess, the individual fingers used for latching an individual switching device and for carrying power and data to the individual switching device.

2. The system as claimed in claim 1, wherein the recesses form an array with m rows and n columns in the supply board.

3. The system as claimed in claim 1, wherein the supply board includes at least a plurality of layers of electrically conductive boards, insulated from one another by insulation, composed of at least one of copper and aluminum, and acting as current-carrying conductor layers.

4. The system as claimed in claim 3, wherein three current-carrying conductor layers, together with a conductor layer for a neutral point conductor, form a three-phase network supplying the switching devices.

5. The system as claimed in claim 3, wherein at least one additional layer of conductive material, forms a communication connection.

6. The system as claimed in claim 3, wherein the supply board includes additional layers, and wherein outermost layers of the supply board are at least one of insulation boards and grounded boards which form shielding.

7. The system as claimed in claim 6, wherein at least one of neutral point, grounding and insulation layers of the supply board include the plurality of recesses, so that the individual fingers, which are free-standing, on the conductive boards project into the recesses.

8. The system as claimed in claim 7, wherein the recesses in the conductor layers are formed as yokes with a projection and form the individual fingers.

9. The system as claimed in claim 1, wherein a contact support is pushed laterally over the contact fingers in order to fit a switching device into the cutouts in the supply board.

10. The system as claimed in claim 9, wherein the contact support includes two comb-like insulating pieces pressed against one another, so that all the conductor layers in the supply board are connected to and contacted with corresponding conductors in the associated switching device one process.

11. The system as claimed in claim 10, wherein the contact support is also used for mechanical mounting of the switching device on the supply board.

12. The system as claimed in claim 11, wherein a screw connection is used for fixing the comb-like insulating pieces.

13. The system as claimed in claim 1, wherein an array in which the cutouts are arranged in the supply board is matched to the dimensions of the smallest switching device used.

14. The system as claimed in claim 4, wherein at least one additional layer of conductive material, forms a communication connection.

\* \* \* \* \*